Sept. 1, 1964     D. W. DUNIPACE ETAL     3,147,104
APPARATUS FOR TREATING MULTIPLE SHEET GLAZING UNITS
Original Filed Oct. 31, 1957     3 Sheets-Sheet 1
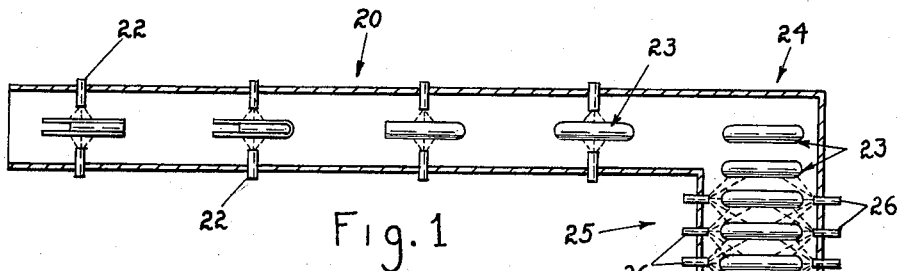
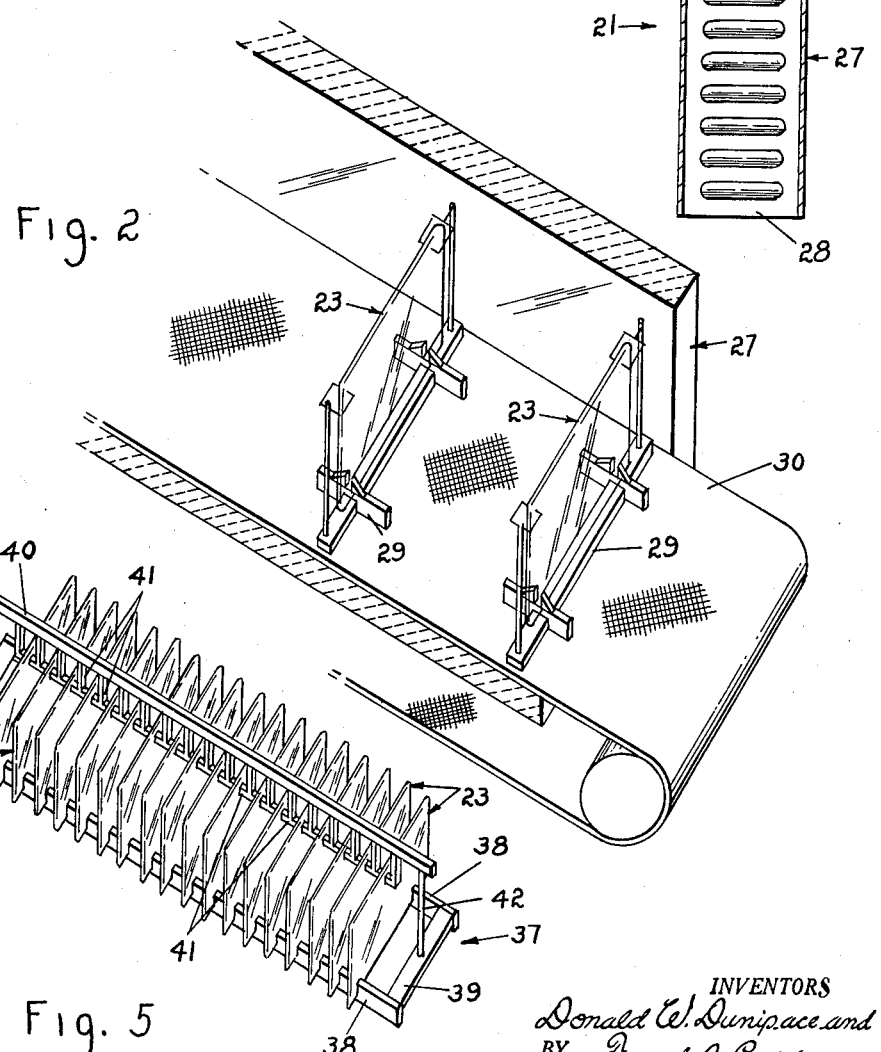
INVENTORS
Donald W. Dunipace and
BY Frank J. Carson
Nobbe & Swope
ATTORNEYS Sept. 1, 1964     D. W. DUNIPACE ETAL     3,147,104
APPARATUS FOR TREATING MULTIPLE SHEET GLAZING UNITS
Original Filed Oct. 31, 1957     3 Sheets-Sheet 2
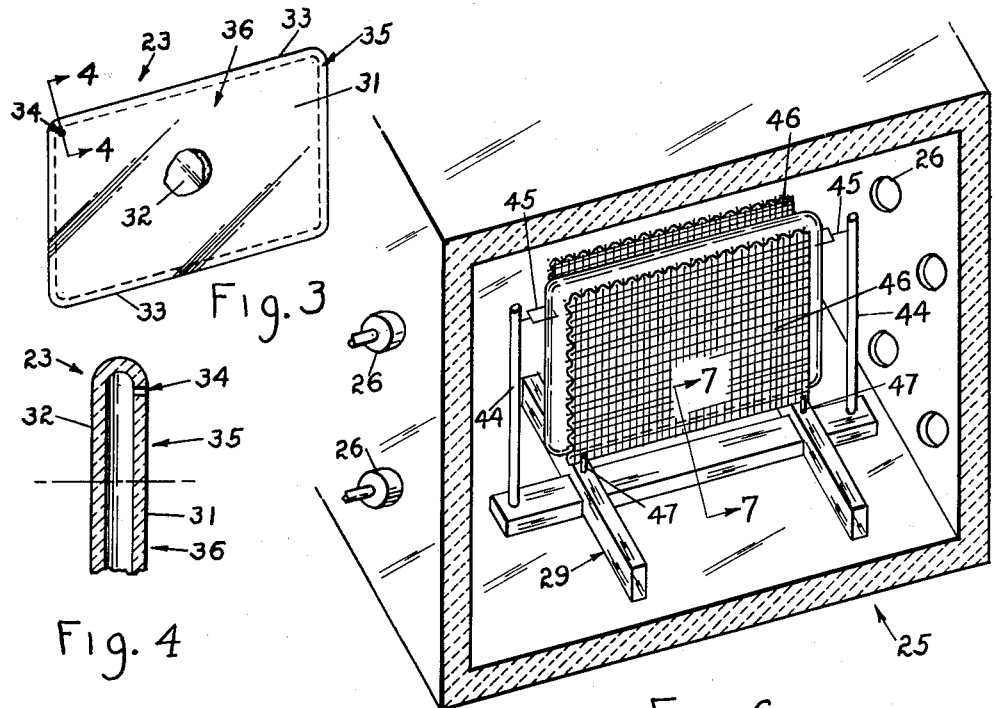
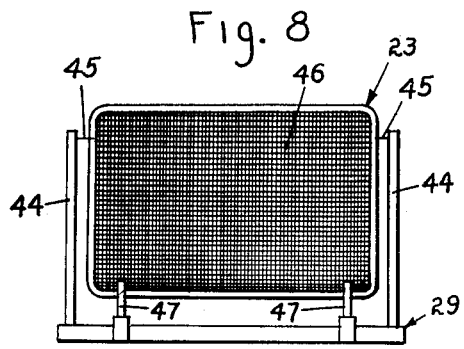
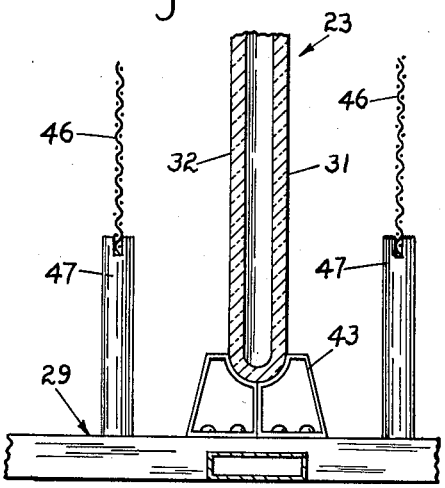
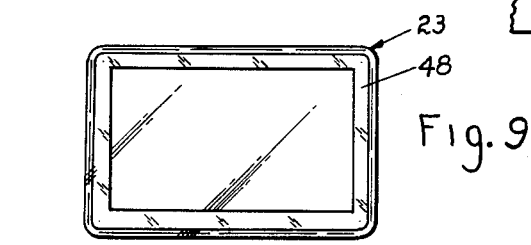
INVENTORS
Donald W. Dunipace and
BY Frank J. Carson
Nobbe & Swope
ATTORNEYS Sept. 1, 1964   D. W. DUNIPACE ETAL   3,147,104
APPARATUS FOR TREATING MULTIPLE SHEET GLAZING UNITS
Original Filed Oct. 31, 1957   3 Sheets-Sheet 3

INVENTORS
Donald W. Dunipace and
BY Frank J. Carson
Nobbe & Swope
ATTORNEYS

United States Patent Office

3,147,104
Patented Sept. 1, 1964

3,147,104
APPARATUS FOR TREATING MULTIPLE SHEET GLAZING UNITS
Donald W. Dunipace, Perrysburg, and Frank J. Carson, Toledo, Ohio, assignors to Libbey-Owens-Ford Glass Company, Toledo, Ohio, a corporation of Ohio
Original application Oct. 31, 1957, Ser. No. 693,711, now Patent No. 3,002,321, dated Oct. 3, 1961. Divided and this application Nov. 3, 1960, Ser. No. 93,824
6 Claims. (Cl. 65—349)

This invention relates broadly to multiple sheet glazing units. More particularly, the invention relates to an improved apparatus for treating all-glass multiple sheet glazing units in order to reduce breakage produced by thermal and mechanical shocks.

This application is a division of copending application Serial No. 693,711, filed October 31, 1957.

In one method of manufacture of all-glass multiple sheet glazing units, a pair of preheated sheets are held in spaced parallel relation, the margins are heated and deformed under pressure and heat is applied to establish intimate contact and fusion of these margins thereby forming a unitary glazing unit encompassing a chamber. It has been found that the fused marginal edges are in tension and as a consequence the glazing unit so formed will have a tendency to break easily at these edges. Various factors have been found to contribute to the production of tension in the edges of the unit, including the heating of the edges to a temperature well above that of the rest of the sheets, and increasing the cross-sectional area at the point of fusion. It is recognized that changing the shape, or uneven heating and cooling of any body, alters the internal stresses, and in this instance, results in the margins being in tension.

Since glass has the fundamental property of being able to withstand compressive forces much better than tensile forces it is advisable to place a glass article in compression in regions where it is liable to be subjected to shocks or to supplant existing tensile forces with compressive ones in order to make the article a more stable one. The removal or reduction of tensile forces or the supplanting of compressive forces therefor may be accomplished by controlled localized or regional annealing.

Now, according to the invention it is proposed to produce a marginal area of compressive forces in all-glass multiple sheet glazing units of the type described herein. In order to obtain this area of compression a novel apparatus has been developed for use in annealing these units.

Therefore, it is an object of this invention to produce an all-glass multiple sheet glazing unit in which the tendency toward chipping and breaking of the edges is reduced by establishing a marginal compression zone in the units.

It is another object of this invention to control the annealing of all-glass glazing units to produce a marginal compression zone in the units.

It is another object of this invention to control the annealing of all-glass glazing units to produce marginal compressive forces and central tensile forces therein.

It is another object of the invention to provide apparatus for zonally controlling the rate of cooling of an all-glass double glazing unit.

Another object of the invention is to provide annealing apparatus for an all-glass double glazing unit wherein the cooling of the marginal portions of the unit is accelerated.

Still another object of the invention is to provide annealing apparatus for an all-glass double glazing unit wherein the cooling of the central portions of the unit is retarded.

Still another object of the invention is to provide zone controlled annealing apparatus wherein a temperature differential is maintained between the zone during the annealing cycle.

Yet another object of the invention is to provide annealing apparatus for an all-glass double glazing unit wherein the cooling of the marginal portions are accelerated while the cooling of the central portion is retarded.

Other objects and advantages of the invention will become more apparent during the course of the following description when read in conjunction with the accompanying drawings.

FIG. 1 is a schematic plan view of an all-glass multiple sheet glazing unit production line showing fusing and annealing areas;

FIG. 2 is a fragmentary view of the exit portion of an annealing lehr showing two all-glass multiple sheet glazing units in position to be treated according to the invention;

FIG. 3 is a perspective view of an all-glass double glazing unit with which the invention is concerned;

FIG. 4 is a section taken along the line 4—4 of FIG. 3;

FIG. 5 is a perspective view of a plurality of all-glass glazing units being annealed according to one form of the invention;

FIG. 6 is a perspective view of an all-glass double glazing unit being annealed according to another form of the invention;

FIG. 7 is a section taken on the line 7—7 of FIG. 6;

FIG. 8 is a side elevation of the double glazing unit of FIG. 3 showing the extent of a heat shield used in still another form of the invention;

FIG. 9 is an additional form of heat shield which may be used with the apparatus of FIG. 8;

Figure 10:
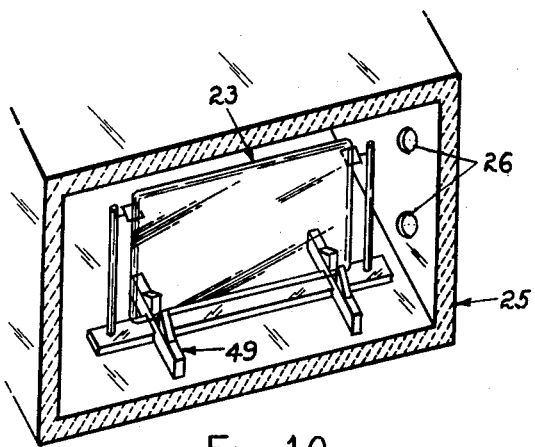
FIG. 10 is a perspective view of a double glazing unit in an annealing furnace.

In recent years there has been an upward surge in the demand for double glazed windows, particularly in the larger sizes. Heretofore, metal separators have been used to space the sheets, and their use requires costly metallizing of the adjacent marginal edges of the sheets and subsequent soldering together of the sheets and the strips. This method produces a good quality double glazing unit but the cost per unit limits widespread usage. Consequently, manufacturers have been constantly trying to develop other means of improving the quality and reducing the cost of these units. As a result of this development program, the all-glass double glazing unit has been produced.

Referring now to the drawings there is shown in FIG. 1 a production line for producing all-glass multiple sheet glazing units of the type with which the present invention is concerned. The production line is divided into two main sections, one for sealing shown generally at 20 and one for annealing shown generally at 21. The sealing section includes a furnace in which the temperature is maintained in a range of 900–1000° F. and in which furnace the complete sealing operation takes place. This high temperature is maintained so that when fusing of the glass sheets is accomplished the sheets will sustain a minimum of thermal shock and thus are less liable to break during subsequent fusing of the edges. Two sheets of glass which are to be formed into a completed glazing unit are introduced into the sealing section 20 and placed on a conveyor which carries the sheets in a continuous manner through the sealing section in the direction of the arrow while holding them in an upright fixed spaced face-to-face relation. The lower pair of mutually opposed edges of the sheets have their temperature raised to the softening point of the glass by sealing burners 22 which are are arranged along the path of movement and direct impinging flames onto these lower marginal edges. The softened edges then move between a pair of shaping rollers (not shown) which urges the softened edges into contact with one another and thus causes the edges to weld together forming a sealed edge. After one edge has been sealed as described above the sheets are rotated on the conveyor through an angle of 90° so that a new pair of unsealed edges is now in the lower position. This lower pair of unsealed edges is moved through another set of sealing burners and sealing rollers with the operation the same as described above. The sealing and rotating is repeated until the four sides of the glass sheets are sealed together and a completed glazing unit 23 is produced.

The completed units 23 leave the sealing area 20 and enter a transfer station 24 in which they are placed onto racks for conveyance through the annealing section 21. A description of these racks and the mounting of the glazing units will be described in detail later.

The annealing section 21 includes a furnace 25 heated by a series of burners 26 to insure that the temperature of the glazing units is brought above the annealing point of glass. When this has been achieved the glazing units are then taken through a cooling portion or annealing lehr 27 in which the temperature of the glazing units is gradually reduced, so that when the units reach the exit 28 of the annealing lehr the temperature of the units has been reduced sufficiently so that the shock to the units on being brought into room temperature will not crack or break them.

Although the operation discussed in the above paragraph defines the fusing and annealing as being one continuous process it is, of course, not meant to imply that it is the only way in which this can be done. For example, after the glazing units have been sealed they may be removed and stored and at a later time run through an annealing furnace and lehr. Also, the temperature of the units may drop to a point above or below the annealing point, and then the burners 26 will act to raise or maintain the temperature above the annealing point as the case may be. Additionally, the particular shape of this glazing unit production line, namely an L shape, is not only possible configuration. Thus, it could very easily be made into one long line or a number of various shapes depending on factory space available or other limiting factors.

FIG. 2 illustrates two glazing units 23 mounted on racks 29 being conveyed through the lehr 27 by means of a continuous conveying belt 30 which conveyor belt 30 may be powered by any conventional means.

As stated above, it has been found that when a double glazing unit has a stress distribution of relatively high compressive forces at the marginal edges and corresponding tensile forces in the central portions of the sheets, the edges of the unit have a greater resistance to breakage than with other distributions of stress forces. This particular force distribution may be achieved by elevating the temperature of the unit above the annealing point of glass which is approximately 950 degrees F., and thereafter cooling the marginal edges of the double-glazing more rapidly than the central portion. Initially, the marginal edges will "set up" before the central portions of the glass sheets and accordingly place the edges in tension. However, as the cooling process continues and the central portions begin to "set up" the marginal edges will be placed in compression.

The apparatus of the invention, described hereinafter, is designed to either retard the cooling rate of the central portions of a glazing unit, to accelerate the cooling of the marginal edges, or to both retard the cooling of the central portions and to accelerate the cooling of the marginal edges. The variations in the difference in the rate of cooling between the marginal portions and the central portions of a double glazing unit permit the selection, over a relatively wide range, of the degree of marginal compression, and of course, the degree of the resulting tensile forces obtained in the central regions of the unit. The choice of the amount of marginal compression desired will be governed by the size of the unit or on the use to which the unit is to be put.

It will be noted that in the various forms of the invention the double glazing unit is maintained in a vertical position during the heating and cooling periods of the annealing. The vertical positioning of the glazing unit permits its being heated to a higher temperature without producing a sagging of the central portions of the sheets. Any sagging of the central portions of a glazing unit results in a unit having optical distortion which, obviously, is not a desirable condition and is avoided if at all possible.

An all-glass double glazing unit annealed in the manner of the invention will withstand physical or thermal shocks encountered in normal processing, shipping, installation and service.

Referring to FIG. 3, the all-glass double sheet glazing unit 23 comprises two sheets of glass 31 and 32 which are heated and bent inwardly at their edges 33 and fused together to form a unitary hollow structure. One or more dehydration holes 34 are placed in one of the sheets, or in an edge, prior to assembly. The purpose of the dehydration holes is to provide a means for dehydrating the enclosed space of the glazing unit which prevents the formation of unsightly moisture on the inner faces of the unit.

The dashed lines in FIG. 3 serve to define the approximate areas of compressive and tensile forces which are finally obtained in a glazing unit annealed according to the invention, the former area including the marginal portion of the glazing unit is designated by the numeral 35 while the latter area including the more central portions of the glazing unit is designated by the numeral 36.

In FIG. 5 there is illustrated a plurality of sealed glazing units 23, mounted on a special rack 37 which maintains the glazing units in a fixed spaced face-to-face relation. This rack is loaded in the transfer station 24 and carried through the annealing furnace 25, annealing lehr 27 and thence out to room temperatures. Because of the spaced face-to-face relationship of the glazing units being maintained throughout the cooling in the annealing lehr the marginal edge portions 34 of the units will be cooled at a more rapid rate than the portion of the units which are spaced inwardly of the edges. This condition is achieved because the more central portions of the glazing units shield one another and in that way retard the cooling of these central portions. The differential cooling rates of the edges and the central portions of the glazing units produce a condition of compression within the marginal edges 35. The amount of this compression obtained in the edges of the unit may be varied by changing the spacing of the units and the rate at which the rack is carried through the annealing lehr.

The rack 37 consists of two support bars 38 maintained in parallelism by spacing bars 39. The upper surface of these support bars are provided with a plurality of equally spaced notches which are of sufficient dimensions to receive the edges 33 of a glazing unit. There is also provided an upper support bar 40 provided with a plurality of separators 41 so that when the bar 40 is lowered onto the top edges of a plurality of glazing units placed in position in the notches of the support bars 38, separators 41 maintain the upper portions of the glazing units in an equally spaced relation. This upper support bar 40 is removably carried by vertical supports 42.

FIGS. 6, 7 and 8 illustrate apparatus used in another method of placing the edges of a glazing unit in compression according to the invention. As shown in FIG. 6, there is provided an annealing furnace 25 with a heating means 26 and a rack 29 with multiple low mass cradles 43 (FIG. 7) which receive the lower edge of a glazing unit to be annealed. A pair of upright supports 44 rise from the rack 29 adjacent the ends and each carries near its upper end a forked finger 45 which grasps the glazing unit at either side to maintain it in an upright position. A pair of heat absorbing shields 46, one at each side of the glazing unit, are supported vertically in spaced relation to the sheet surfaces of the glazing unit on posts 47 which are secured to the rack 29. The heat absorbing shields are smaller than the glazing unit and when in mounted position the edges of the shields are spaced inwardly from the edges of the glazing by an amount that substantially represents the area which is to be in compression after annealing. The shields may be of any non-inflammable heat absorbing material such as hardware cloth made of relatively heavy gage wire, Marinite, or metal sheeting and may also be varied in thickness to increase or decrease the mass thereof in order to control the shielding properties. Additionally, the space between the glazing units and the shields may be altered to provide a further control of the shielding properties.

In FIG. 9 there is shown another type of shield 48 in the form of a hollow rectangular bar. This modified shield is positioned with respect to the glazing unit 23 similarly as shield 46 shown in FIGS. 6, 7 and 8. Whether a shield 46 or 48 is used, the remainder of the apparatus and the annealing method followed are the same.

Figure 11:
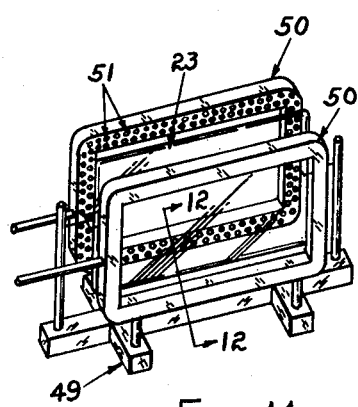
FIG. 11 is a perspective view of annealing apparatus for use in another modified form of the invention.
Figure 12:
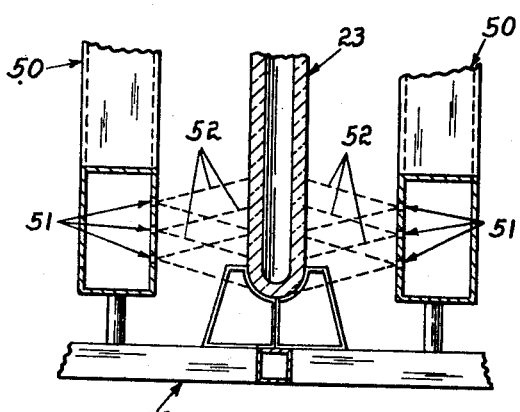
FIG. 12 is a section taken alonge line 12—12 of FIG. 11.

Another modified form of annealing apparatus is shown in FIGS. 10, 11 and 12 wherein a double glazing unit 23 is supported vertically on a rack 49, which rack is similar to the rack 29 of FIG. 6 but is not equipped with heat absorbing shield. After the furnace temperature has been raised enough to bring the temperature of the glazing unit to the annealing temperature, the rack 49 and the glazing unit 23 are removed and a pair of air conveying ducts 50 are secured to the rack 49, in any suitable manner, in spaced relation to the marginal surfaces of the glazing unit 23 as shown in FIG. 11. The ducts 50 are provided with a plurality of holes 51 and of such a configuration as to direct currents of air over the entire marginal areas of the glass as indicated by the dashed lines 52 in FIG. 12. These air currents 52 may be constant in temperature or may be made progressively cooler to reduce the temperature of the glazing unit rapidly without inducting fractures due to excessiv chilling. This rapid cooling of the edges in conjunction with cooling of the central portion at a normal rate produces the desired areas of compression and tension described hereinabove.

Figure 13:
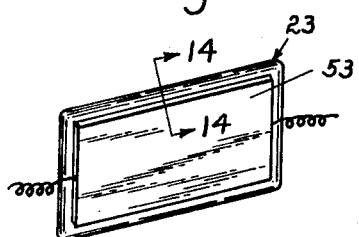
FIG. 13 is a perspective view of annealing apparatus of still another modified form of the invention.
Figure 14:
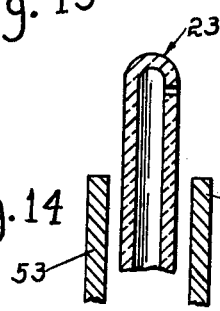
FIG. 14 is a section taken along line 14—14 of FIG. 13.

FIGS. 13 and 14 illustrate still another modified annealing apparatus wherein the double glazing unit 23 is supported vertically on a rack 49 in a furnace 25 as in FIG. 10. When the furnace has brought the glass to the required temperature, the rack 49 supporting the glazing unit 23 is removed from the furnace and platens 53, which are heated electrically or by other suitable means, are placed in spaced, parallel relation to the surfaces of the glazing unit. These platens extend only over the central surface area of the glazing unit 23 leaving the marginal edges exposed for rapid cooling while the platens retard the cooling in the central area.

Figure 16:
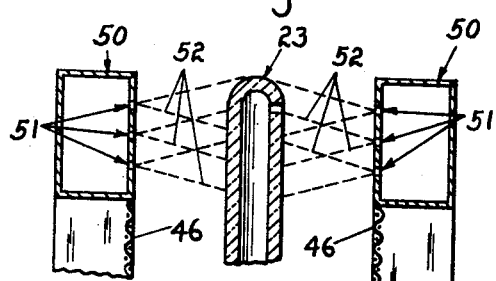
FIG. 16 is a section taken along line 16—16 of FIG. 15.
Figure 15:
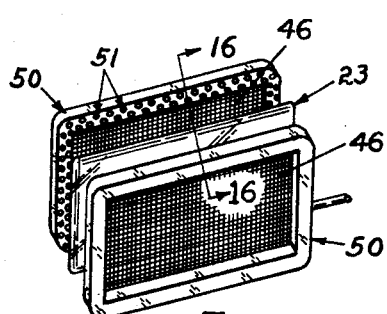
FIG. 15 is a perspective view of annealing apparatus in still another modified form of the invention.

FIGS. 15 and 16 illustrate a still further satisfactory modification of the invention combining the centrally disposed shields 46 of FIGS. 6, 7 and 8 with the air ducts 50 of FIGS. 11 and 12 for circulating currents 52 of cooling air over the marginal areas of the glazing unit 23. The combination of the use of shields and the air ducts creates a greater temperature differential between the marginal areas and the central area of the glazing unit during the cooling period than the previously given methods thus producing a unit possessing a higher ratio of compressive forces on the edge to tensile forces in the central regions, which in some types of units is desirable.

Annealing apparatus, other than that disclosed herein primarily for purposes of illustration, may be used to achieve a satisfactory stability in a double glazing unit, including cooling the edges by circulating a refrigerant through duct work adjacent the margins of the glazing unit, applying other heat loss retarding means adjacent the central area of the glazing unit or combinations thereof. However, it is to be understood that the forms of the invention herewith described are to be taken as illustrative embodiments only of the same and that various procedural changes may be resorted to without departing from the spirit of the invention or the scope of the appended claims.

We claim:

1. Apparatus for heat treating all-glass multiple sheet glazing units composed of sheets of glass disposed in spaced, face-to-face relation with the edge portions thereof fused together to form a sealed edge wall, said apparatus comprising a furnace for heating said units to a temperature above the annealing point of the glass, a cooling chamber for gradually reducing the temperature of said units, a rack for supporting a plurality of said units on edge, means carried by said rack for maintaining said units in spaced, parallel, face-to-face relationship such that the central portions of the units shield each other from the relatively cool atmosphere in said cooling chamber thereby permitting the temperature of the edge portions of the units to be reduced at a more rapid rate than said central portions, and conveying means supporting said rack for movement through said furnace and said cooling chamber in a direction substantially normal to the major surface areas of said units.

2. In an apparatus for heat treating all-glass multiple sheet glazing units composed of sheets of glass disposed in spaced, face-to-face relations with the edge portions thereof fused together to form a sealed edge wall, the combination of a furnace for heating said units to a temperature above the annealing point of the glass, a cooling chamber for gradually reducing the temperature of said units, means supporting said units in a substantially vertical plane, shielding means disposed on said supporting means in face-to-face relation with said units such that the edge portions of the units are cooled at a more rapid rate than the central portions thereof, and means for supporting and conveying said supporting means and units through said furnace and said cooling chamber in a direction substantially normal to the major surface areas of said units.

3. An apparatus for treating glazing units as in claim 2, wherein said shielding means includes a heating means.

4. An apparatus for treating glazing units as in claim 2 wherein the shielding means includes a body member of such dimensions that when placed in operating position it masks a portion of the glazing unit spaced inwardly from the marginal edge portions to place said edges in compression.

5. Apparatus for heat treating glazing units as defined by claim 1, including means adjacent the marginal edge portions of said unit to accelerate the rate of cooling of said edge portions.

6. An apparatus for treating glazing units as in claim 5 wherein said cooling means includes an air conveying duct containing a plurality of openings for directing streams of air onto the marginal edge portions of the glazing unit to place said edges in compression.

References Cited in the file of this patent
UNITED STATES PATENTS

| | | |
|---|---|---|
| 555,048 | Lubbers | Feb. 18, 1896 |
| 1,981,560 | Littleton | Nov. 20, 1934 |
| 2,177,324 | Long | Oct. 24, 1939 |
| 2,244,715 | Long | June 10, 1941 |